United States Patent [19]
Nelson

[11] Patent Number: 4,647,485
[45] Date of Patent: Mar. 3, 1987

[54] PACKAGING TAPE

[76] Inventor: Roy E. Nelson, P.O. Box 7, Vega, Tex. 79092

[21] Appl. No.: 859,347

[22] Filed: May 5, 1986

[51] Int. Cl.⁴ .............................................. B32B 3/10
[52] U.S. Cl. .................................... 428/43; 428/136; 428/137; 428/906; 206/611; 206/628
[58] Field of Search ................. 428/43, 136, 137, 906; 206/608, 611, 628, 630

[56] References Cited
U.S. PATENT DOCUMENTS
2,771,385 11/1956 Humphner ...................... 428/189 X Primary Examiner—Alexander S. Thomas
Attorney, Agent, or Firm—James E. Bradley

[57] ABSTRACT

A packaging tape made from a flexible member with a top surface and a bottom surface and a tape body therebetween. A central tear-away portion is formed by two parallel lines of perforations extending for the length of the flexible member. Finger openings located along each of the lines of perforations at spaced intervals expose the central tear-away portion to facilitate severing the flexible member longitudinally.

5 Claims, 4 Drawing Figures

PACKAGING TAPE

BACKGROUND OF THE INVENTION

1. Field of the Invention

This invention relates generally to pressure sensitive and re-moistening packaging tape, and more specifically to such a tape in which a central, perforated portion can be drawn to tear the tape for the opening of letters, cartons, containers, and the like.

2. Description of the Prior Art

Packaging tapes are shown in the prior art for sealing letters, cans, cartons, or for wrapping and sealing packages of various descriptions such as newspapers, periodicals and the like. In U.S. Pat. No. 1,032,026 to Roden, issued July 9, 1912, a sealing strip is shown for use in sealing a can or carton. A thread or cord is designed to run along the longitudinal length of the sealing strip so that the can or carton can be opened by pulling on the free end of the cord, causing it to fracture the sealing strip along the length thereof. The thread or cord is located on the bottom surface of the tape and is secured in position by a thin strip of paper which extends longitudinally on the bottom surface of the sealing strip over the cord. The strip of paper is pasted flat to the bottom surface of the sealing strip.

U.S. Pat. No. 2,771,385 to Humphner, issued Nov. 20, 1956, shows a draw tape having a tear filament located on the underside of the tape which extends longitudinally of the underside and which is united thereto. U.S. Pat. No. 3,360,120 to Getzin, issued Dec. 26, 1967, shows a length of packaging material for packaging filter elements which has a tear ribbon fastened to the bottom surface of the packaging material to facilitate tearing for opening the package.

In each of the above references, a cord or filament is pasted or otherwise affixed to the bottom surface of the tape or packaging strip, adding to the cost and complexity of manufacture. Also, the tear area or portion of the tape is not clearly visible to the user from the top surface of the tape.

The present invention has as its object the provision of an improved packaging tape having a central, perforated portion to facilitate tearing. Another object of the invention is to provide a tape with a tear-away portion which is visible from the top surface of the tape to the user and which facilitates the grasping of the tear-away portion at any point along the entire length of the tape.

Additional objects, features and advantages will be apparent in the written description which follows.

SUMMARY OF THE INVENTION

The packaging tape of the invention is comprised of a flexible member having a length greater than its width which is adapted to be wound on a roll. The flexible member has a top surface and a bottom surface which define a tape body therebetween. At least a portion of the bottom surface of the flexible member has an adhesive applied thereto.

A central, tear-away portion is formed by two parallel lines of perforation which extend for substantially the entire length of the flexible member, the perforations being formed to pass completely through the tape body from the top surface to the bottom surface thereof.

The tape body is also provided with finger openings located along each of the lines of perforations at spaced intervals which expose the central, tear-away portion to facilitate severing the flexible member longitudinally.

DETAILED DESCRIPTION OF THE INVENTION

Figure 1:
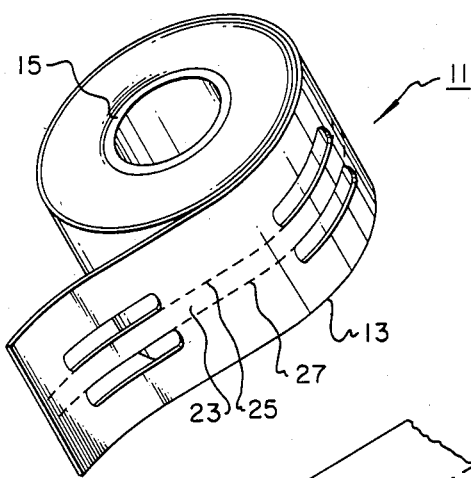
FIG. 1 is a top, perspective view of the packaging tape of the invention being dispensed from a roll.

FIG. 1 shows a packaging tape of the invention designated generally as 11. The packaging tape 11 is comprised of a flexible member 13 having a length "l" greater than its width "w" (see FIG. 2) and being adapted to be wound on a roll 15.

Figure 2:
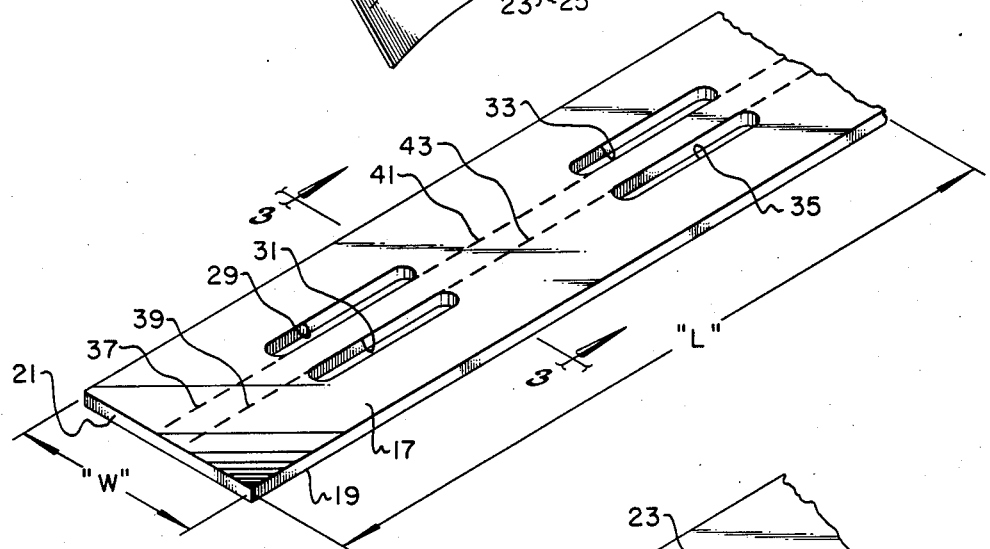
FIG. 2 is a top, perspective view, partly broken away, of the packaging tape of FIG. 1, showing the finger openings in greater detail.

As shown in FIG. 2, the flexible member 13 has a top surface 17 and a bottom surface 19 which define a tape body 21 therebetween. At least a portion of the bottom surface 19 of the flexible member 13 has an adhesive applied thereto. The adhesive can be pressure-sensitive adhesive, so that when the tape is applied to an object, it is secured readily thereto by the sensitive character of the adhesive. The adhesive can also be of the remoistening type, and can consist of an adhesive applied to the bottom surface 19 which is allowed to dry, the adhesive being re-moistened before application to the object to be packaged. It will be understood by those skilled in the art that the present invention can be utilized with any type of adhesive tape. The tape body 21 can be formed of plastic, paper, or any frangible or rupturable material.

The flexible member 13 is provided with a central tear-away portion 23 formed by two parallel lines of perforations extending for substantially the entire length of the flexible member 13. The perforations are formed to pass completely through the tape body 21 from the top surface 17 to the bottom surface 19 thereof. The perforations could be formed in manufacture by drawing the flexible member 13 over a support surface and past a pair of perforating wheels or discs which would be oriented normal to the direction of travel of the flexible member 13.

The flexible member 13 is also provided with spaced pairs of finger openings, e.g. pair 29, 31 and pair 33, 35, which pass through the tape body 21 from the top surface 17 to the bottom surface 19. The spaced pairs of finger openings 29, 31 are located within and extend longitudinally along each of the lines of perforations 25, 27 at spaced intervals to thereby divide the lines of perforations into line segments, e.g. segments 37, 39 and segments 41, 43. The location of the finger openings 29, 31 exposes the central, tear-away portion 23 to facilitate severing the flexible member 13 longitudinally.

The finger openings 29, 31 divide the lines of perforations 25, 27 into line segments 37, 39 and 41, 43 of approximately equal length. The finger openings are preferably formed during manufacture by drawing the flexible member 13 past a pair of die cutters having cutting elements of the shape of the desired openings. The die cutters can be located in line with the perforating wheels used to make the lines of perforations 37, 39 so that the openings 29, 31 can be formed during the perforating operation.

Figure 3:
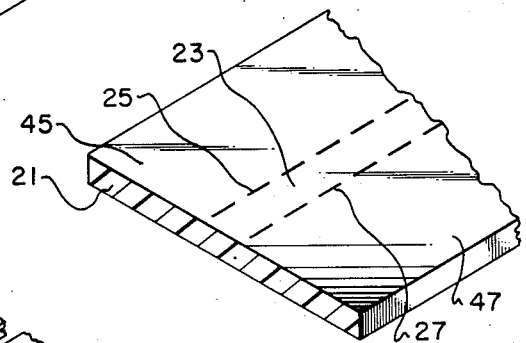
FIG. 3 is a cross-sectional view taken along lines 3—13 in FIG. 2.
Figure 4:
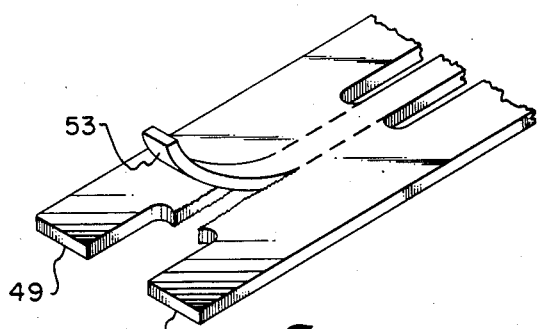
FIG. 4 is a top, perspective view, partly broken away, showing the tear-away portion being torn away from the packaging tape.

As shown in FIG. 3, the central tear-away portion 23 of the tape body formed by the parallel lines of perforations 25, 27 is of generally rectangular planar area and separates an upper and lower body portion 45, 47, respectively, of generally planar rectangular area and of greater relative width than the central tear-away portion. As shown in FIG. 4, an adhesive is applied to the planar rectangular areas 49, 51 of the bottom surface of the flexible member while the bottom surface 53 of the central tear-away portion 23 remains adhesive free.

The packaging tape of the invention has several advantages. The packaging tape is simple in design and economical to manufacture and can be conveniently dispensed from a roll. The central tear-away portion facilitates severing the flexible member longitudinally when removing the packaging. The finger openings allow the user to pull the filament from locations intermediate the free ends and also allow the tear-away portion of the tape to be easily identified by the user.

While the invention has been shown in only one of its forms, it is not thus limited but is susceptible to various changes and modifications without departing from the spirit thereof.

I claim:

1. A packaging tape, comprising:
   a flexible member having a length greater than its width and being adapted to be wound on a roll, the flexible member having a top surface and a bottom surface which define a tape body therebetween, at least a portion of the bottom surface of the flexible member having an adhesive applied thereto;
   a central, tear-away portion formed by two parallel lines of perforations extending for substantially the entire length of the flexible member; and
   the tape body being provided with finger openings located along each of the lines of perforations at spaced intervals which expose the central, tear-away portion to facilitate severing the flexible member longitudinally.

2. A packaging tape, comprising:
   a flexible member having a length greater than its width and being adapted to be wound on a roll, the flexible member having a top surface and a bottom surface which define a tape body therebetween, at least a portion of the bottom surface of the flexible member having an adhesive applied thereto;
   a central, tear-away portion formed by two parallel lines of perforations extending for substantially the entire length of the flexible member, the perforations being formed to pass completely through the tape body from the top surface to the bottom surface thereof; and
   the tape body being provided with spaced pairs of finger openings passing through the tape body from the top surface to the bottom surface thereof, the spaced pairs of finger openings being located within and extending longitudinally along each of the lines of perforations at spaced intervals, to thereby divide the lines of perforations into line segments and to expose the central, tear-away portion to facilitate severing the flexible member longitudinally.

3. The packaging tape of claim 2, wherein the spaced pairs of finger openings divide the lines of perforations into line segments of approximately equal length.

4. The packaging tape of claim 2, wherein the central tear-away portion of the tape body formed by the parallel lines of perforations is of generally rectangular planar area and separates an upper and lower body portion of generally planar rectangular area and of greater relative width than the width of the central tear-away portion.

5. The packaging tape of claim 4, wherein an adhesive is applied to the upper and lower planar rectangular areas of the bottom surface of the flexible member and wherein the central tear-away portion of the bottom surface is adhesive free.

* * * * *